3,298,436
METHOD OF SECONDARY OIL RECOVERY USING SURFACTANTS FORMED IN SITU

William M. McCardell, Hinsdale, Ill., assignor, by mesne assignments, to Esso Production Research Company, Houston, Tex., a corporation of Delaware
No Drawing. Continuation of application Ser. No. 709,783, Jan. 20, 1958. This application Oct. 30, 1964, Ser. No. 407,855
7 Claims. (Cl. 166—9)

This application is a continuation of Serial No. 709,783, entitled, "Method of Oil Recovery," filed January 20, 1958, by William M. McCardell, now abandoned.

This invention relates to recovery of oil from underground reservoirs and especially to recovery of oil from nonproductive reservoirs or depleted reservoirs.

Production of oil by any of the known reservoir-producing techniques as, for example water drive, gas cap drive, dissolved gas drive, gravity drainage, etc., leaves significant quantities of oil in the reservoir. The most efficient of these displacement mechanisms, whether the mechanism is a primary (naturally occurring) or secondary (rejuvenating) operation, involves displacement of oil by water. However, even this techniques leaves from one-tenth to one-third of the total reservoir pore space filled with oil.

When the water attains a certain local saturation during a waterflooding operation, the continuous oil filaments break into disjointed segments which are entrapped and held immobile by capillary forces. In the past surface-active materials or surfactants have been employed to reduce the magnitude of the capillary forces in an attempt to prevent entrapment of the oil or to free the oil after it has been trapped. In certain instances where the oil is held at least partly by its adhesion to the rock surfaces, surface-active agents also may act as a detergent.

In a waterflood-type displacement the connate water which is originally present in the reservoir is displaced by the floodwater and forms a bank between the displaced oil and the injected water. Because of the formation of this configuration, the connate water, under any injection conditions, is the water which displaces the oil. Therefore, surfactants, in any form, cannot be used to prevent trapping of the oil and to be effective, must be designed to work on the trapped oil.

Essentially, then, the initial displacement in a waterflooding process in which a surface-active agent has been added to the floodwater is no different from that which normally occurs in a waterflooding operation in which no surface-active agent is used as an additive to the floodwater. The oil is degraded and trapped in the usual manner and the only value that the surface-active agent serves in the floodwater is to help in freeing this oil after it has been trapped. However, for the latter action to be effective, the interfacial tension must be extremely low for practical flooding rates or an additional means must be found of supplying energy to aid in the disintegration of the trapped oil.

Economics restrict the quantity of surface-active agent which may be used. Therefore, surface-active agents added to the waterflood externally are effective only a short distance from the water injection well bore because the restricted quantity used is adsorbed onto the rock.

The invention described herein overcomes present disadvantages in the use of surface-active agents by forming the surface-active agents in situ. Producing surface-active agents in situ has advantages over the simple introduction of the surface-active agents to the water used in flooding in that the surface-active agents are produced and concentrated in the interface where they are most needed and because of this location, do not contact the rock surfaces with resultant adsorption by the rock surfaces. Also, variations in the interfacial tension which result from differences in concentration of the surface-active agents at different positions in the interface cause localized stirring and turbulence which tend to cause the trapped oil to emulsify itself spontaneously. Further, the interfacial tension during the transient phase in which a surface-active agent is coming to equilibrium between the oil and water phases may be reduced below its equilibrium value by a factor of 100. This is believed to be the result of the fact that a much larger concentration of surface-active agent is maintained in the interface by in-situ formation than can be attained at equilibrium when the total concentration of surface-active agent is in the water phase.

An object, therefore, of this invention is to improve recovery of oil from subsurface formations by forming surface-active agents in situ during waterflooding operations.

Briefly, the invention comprises the steps of introducing into the oil phase of a subsurface oil reservoir a first reactive, oil-soluble material, injecting water into said reservoir, the water containing a second reactive water-soluble material whereby when said water phase contacts said oil phase the reactive materials chemically react to produce surface-active material at the oil-water interface. The reactive, oil-soluble material may be introduced into the reservoir in a hydrocarbon oil or the reactive acid material may be indigenous to the oil phase of the reservoir. The hydrocarbon oil may be e.g. reservoir oil from the same reservoir into which the acid material is introduced or reservoir oil from a different reservoir. In either case, the reactive material is first mixed at the surface with reservoir oil and, then, this mixture is injected into the reservoir to be waterflooded.

A series of waterflooding experiments were conducted according to the invention, the results of which are shown in Table I:

TABLE I

Sand Col. "G"—Permeability, 25 darcys; Porosity, 31%; Connate Water, 13%; Original Oil, 87%

| Flood No. | Pore Vols. Water Injected | Pressure Drop, p.s.i./ft. | Flow Rate, ft./day | Oil Recovered, Percent Original | pH of Flood Water | Interfacial Tension, dyne/cm. |
|---|---|---|---|---|---|---|
| 1 | | | | 79.3 | 6.7 | 25.0 |
| 2 | 28.5 | 2.02 | 532 | 84.3 | 8.2 | 0.5 |
| 3 | 69.6 | 6.15 | 1,172 | 91.9 | 8.4 | 0.15 |
| 4 | 13.6 | 4.90 | 1,452 | 92.6 | 9.1 | 0.17 |

Sand Col. "H"—Permeability, 24 darcys; Porosity, 31%; Connate Water, 13%; Original Oil, 87%

| 5 | 6.6 | 2.54 | 725 | 82.1 | 6.7 | 25.0 |
| 6 | 12.0 | 5.94 | 9.7 | 96.2 | 8.3 | 0.16 |

TABLE I—Continued.

Sand Col. "I"—Permeability, 26 darcys; Porosity, 31%; Connate Water, 12%; Original Oil, 88%

| Flood No. | Pre Vols. Water Injected | Pressure Drop, p.s.i./ft. | Flow Rate, ft./day | Oil Recovered, Percent Original | pH of Flood Water | Interfacial Tension, dyne/cm. |
|---|---|---|---|---|---|---|
| 7 | 2.1 | 1.35 | 105 | 95.6 | 8.3 | 0.16 |

Sand Col. "J"—Permeability, 24 darcys; Porosity, 31%; Connate Water, 14%; Original Oil, 86%

| 8 | | 3.59 | 570 | 93.2 | 8.4 | 0.2 |

Sand Col. "K"—Permeability, 25 darcys; Porosity, 31.7%; Connate Water, 15%; Original Oil, 85%

| 9 | | | 5.0 | 91.8 | 8.4 | 0.3 |

Sand Col. "L"—Permeability, 2.3 darcys; Porosity, 33%; Connate Water, 8%; Original Oil, 92%

| 10 | | 25.0 | | 94.3 | 8.4 | 0.2 |

Sand Col. "M"—Permeability, 2.0 darcys; Porosity, 34%; Connate Water, 19%; Original Oil, 81%

| 11 | | 24.7 | 334 | 94.0 | 8.5 | *1.6 |

*Viscosity of flood fluid which was 67% glycerol=15 cps.

The procedure for conducting runs 1–9, sand columns "G"–"K" of Table I was as follows:

A Lucite tube three feet long and 1.5 inches internal diameter was packed with 50–70 mesh Ottawa sand. Packing was done vertically using dry sand and mechanically settled with a hammer. The tube was then saturated with one normal sodium chloride solution and flooded with viscous white oil to obtain connate water saturation. The use of viscous white oil is a laboratory convenience to achieve connate water saturation within a reasonable time. This viscous oil was replaced with kerosene containing 1% oleic acid by volume upon which the experiments were performed. A salt solution was prepared containing one normal sodium ion and buffered to the indicated pH with sodium hydroxide and boric acid. This salt solution was used to flood the column vertically, the solution being injected from the bottom of the column.

Run No. 1 was a flood with unbuffered brine in order to bring the column to a residual oil representative of residual oil after a conventional waterflood.

Runs 10 and 11, sand columns "L" and "M" of Table I, were conducted similarly; however, instead of a three-feet long and 1.5-inches internal diameter Lucite tube, a two-feet long and 1-inch internal diameter Lucite tube was employed. Also, the tube in the latter experiments was packed with American Graded Sand Co. No. 16 sand.

The data of Table I show a high percentage of original oil recovery when the interfacial tension is reduced below 0.5 dynes/cm. For example, all of the runs show over 90% recovery of original oil when the interfacial tension is reduced below 0.5 dynes/cm. However, as shown by Run No. 2, a much lesser recovery of 84% original oil was obtained at 0.5 dynes/cm. and at interfacial tensions of 25.0 dynes/cm., the percent original oil recovery is also much less as indicated by Runs 1 and 5 wherein 79.3 and 82.1, respectively, percentages original oil recovered were obtained.

It is to be noted that the data cover rates of flow ranging from 5 to 1172 feet per day and permeabilities ranging from 2 to 25 darcys.

To illustrate that flooding with water containing surface-active material is not effective in increasing recovery of oil, reference is made to Tables II and III:

TABLE II

| | Incremental Water Injected, Pore Volumes | Oil-Water Interfacial Tension, dynes/cm. | Oil Recovered, Percent Original |
|---|---|---|---|
| 1 | 4.2 | 42 | 84.4 |
| 2 | 8.5 | 30 | 78.0 |
| 3 | 59 | 17 | 85.7 |
| 4 | 77 | 9.5 | 85.7 |
| 5 | 17 | 6 | 78.0 |
| 6 | 13 | 2 | 78.0 |
| 7 | 15 | 0.45 | 81.5 |

TABLE III

| | Incremental Water Injected, Pore Volumes | Concentration of Triton X-100 in Floodwater | Oil Recovered, Percent Original |
|---|---|---|---|
| 1 | 11.7 | Distilled H$^2$O | 82.5 |
| 2 | 11 | 0.00001 gm./ml. | 86.7 |
| 3 | 15 | 0.00001 gm./ml. | 83.0 |
| 4 | 18 | 0.0001 gm./ml. | 83.5 |

The data of Table II were obtained in the following manner:

A three-feet long column was packed with a 30-darcy unconsolidated sand and subsequently prepared to contain a low saturation of water, 0.1 normal sodium chloride, and a high saturation of kerosene. The column was then waterflooded with 0.1 normal sodium chloride solution to residual oil. The waterflood was then continued with 0.1 normal sodium chloride solutions containing a constant amount of Triton X–100, a surface-active material. The percentages of original oil recovered for various oil-water interfacial tensions are tabulated. As shown in Table II reduction in interfacial tension has little effect upon oil recovery when employing a surface-active agent in the water phase even when the interfacial tension is reduced below 0.5 dynes/cm. (No. 7).

The data of Table III were obtained in a manner similar to that described for obtaining the data of Table II except that varying amounts of the surface-active agent Triton X–100 were employed. The percentages of original oil recovered for various concentrations of Triton X-100 for various pore volumes are tabulated. As shown in Table III, varying the amount of the surface-active agent has little effect upon oil recovery.

Although only oleic acid was employed to form the surfactants in situ in obtaining the data of Table I, other acids may be used instead as for example:

Saturated aliphatic acids of the general formula, $$C_nH_{2n+1}COOH$$

as, for example, lauric acid, $C_{11}H_{23}COOH$, myristic acid, $C_{13}H_{27}COOH$, palmitic acid, $C_{15}H_{31}COOH$, stearic acid, $C_{17}H_{35}COOH$; monoethylenic aliphatic acids of the general formula $C_nH_{2n-1}COOH$ as, for example, lauroleic acid, $C_{11}H_{20}COOH$, myristoleic acid, $C_{13}H_{25}COOH$, palmitoleic acid, $C_{15}H_{29}COOH$, oleic acid, $C_{17}H_{33}COOH$; dienoic aliphatic acids of the general formula $$C_nH_{2n-3}COOH$$

as, for example, linolenic acid, $C_{17}H_{31}COOH$, 9,11 octadecadienoic acid, $C_{17}H_{31}COOH$; trienoic aliphatic acids of the general formula, $C_nH_{2n-5}COOH$, as, for example, linolenic acid $C_{17}H_{29}COOH$, eleostearic acid, $$C_{17}H_{29}COOH$$

hydroxy aliphatic acids of the general formula, $$C_nH_{27}(OH)(COOH)$$

as, for example, hydroxylauric acid, $$C_{11}H_{22}(OH)(COOH)$$

sabinic acid, $C_{11}H_{22}(OH)(COOH)$, hydroxymyristic $$C_{13}H_{26}(OH)(COOH)$$

hydroxypalmitic, $C_{15}H_{30}(OH)(COOH)$, hydroxystearic $C_{17}H_{34}(OH)(COOH)$, aleuretic acid, $$C_{15}H_{28}(OH)_3(COOH)$$

ethylenic hydroxy aliphatic acids of the general formula, $C_nH_{2n-2}(OH)(COOH)$ as, for example, ricinoleic acid, $C_{17}H_{32}(OH)(COOH)$; cyclic acids, as for example, hydnocarpic acid, $C_{15}H_{27}COOH$, chaulmoogric acid, $$C_{17}H_{31}COOH$$

halogenated aliphatic acids of the first four classes of aliphatic acids; dicarboxylic acids as, for example, azelaic acid, $C_7H_{14}(COOH)_2$; and aromatic acids as, for example, truxillic acid and its isomer, truxinic acid, $$C_4H_4(C_6H_5)_2(COOH)_2$$

chlorogenic acid, $C_8H_9(OH)_5(COO)(COOH)$, abietic acid, $C_{18}H_{30}(COOH)$.

Having fully described the objects, nature, and operation of my invention, I claim:

1. The method of recovering petroleum oil from natural reservoirs comprising injecting through an injection well and into the oil-containing formation a solution of a first reactant in oil previously recovered from said reservoir, thereafter injecting into the reservoir an aqueous solution of a second reactant capable of reacting with said first reactant under reservoir conditions to form a surfactant, thereafter injecting water into the reservoir in sufficient quantity to produce oil from said reservoir.

2. The method in accordance with claim 1 in which the first reactant is an acidic substance having a sufficiently long carbon chain to make it soluble in the reservoir oil and the second reactant is a water-soluble alkali.

3. The method of recovering petroleum oil from natural reservoirs comprising injecting through an injection well and into the oil-containing formation, a solution of a first reactant in oil previously recovered from said reservoir, thereafter injecting into the reservoir an aqueous solution of a second reactant capable of reacting with said first reactant under reservoir conditions to form a surfactant; said aqueous solution displacing oil to a production well.

4. The method in accordance with claim 3 in which the first reactant is an acidic substance having a sufficiently long carbon chain to make it soluble in the reservoir oil and the second reactant is a water-soluble alkali.

5. The method of recovering petroleum oil from a natural reservoir comprising introducing into said reservoir a solution of a first reactant in oil previously recovered from said reservoir; thereafter injecting into the reservoir an aqueous solution of a second reactant capable of reacting with said first reactant under reservoir conditions to form a surfactant; said aqueous solution being buffered prior to injection into the reservoir to a selected pH; the concentrations of the first and second reactants in the oil and water, respectively, and the pH of the water being selected such that the concentration of the produced surfactant is sufficient to reduce the oil-water interfacial tension below about 0.5 dyne/cm.; said aqueous solution displacing oil to a production well.

6. The method of recovering petroleum oil from a natural reservoir comprising introducing into said reservoir an oil-soluble, first reactant in oil previously recovered from said reservoir; thereafter injecting into the reservoir an aqueous solution of a second reactant capable of reacting with said first reactant under reservoir conditions to form a surfactant; the concentrations of the first and second reactants in the oil and water, respectively, being selected such that the concentration of the produced surfactant is sufficient to reduce the oil-water interfacial tension below about 0.5 dyne/cm.; said aqueous solution displacing oil to a production well.

7. A method as recited in claim 6 in which the first reactant is an acidic substance having a sufficiently long carbon chain to make it soluble in the reservoir oil and the second reactant is a water-soluble alkali.

References Cited by the Examiner

UNITED STATES PATENTS 3,111,984  11/1963  Reisberg _____ 166—9

FOREIGN PATENTS 51,278  10/1941  Netherlands.

CHARLES E. O'CONNELL, *Primary Examiner.*

T. A. ZALENSKI, S. J. NOVOSAD,
*Assistant Examiners.*